United States Patent [19]

Manning

[11] Patent Number: 5,195,615
[45] Date of Patent: Mar. 23, 1993

[54] MINE SHAFT CONVEYANCE SYSTEM

[75] Inventor: Michael J. N. Manning, Warwickshire, England

[73] Assignee: GEC Alsthom Limited, England

[21] Appl. No.: 489,687

[22] Filed: Mar. 5, 1990

[30] Foreign Application Priority Data

Mar. 3, 1989 [GB] United Kingdom ............... 8904875

[51] Int. Cl.⁵ .................................... B66B 11/04
[52] U.S. Cl. .................................... 187/17; 187/112; 310/12
[58] Field of Search .............. 187/17, 112, 110, 1 R; 310/12, 15, 17; 104/290, 292

[56] References Cited

U.S. PATENT DOCUMENTS

| | | | |
|---|---|---|---|
| 3,043,401 | 7/1962 | Hallene et al. | 187/17 |
| 3,771,462 | 11/1973 | Barthalon et al. | 104/148 LM |
| 4,017,001 | 4/1977 | Barthalon et al. | 221/5 |
| 4,570,753 | 2/1986 | Ohta et al. | 187/1 R |
| 5,005,672 | 4/1991 | Nakai et al. | 187/17 |

FOREIGN PATENT DOCUMENTS

| | | | |
|---|---|---|---|
| 2002081 | 1/1970 | Fed. Rep. of Germany. | |
| 2359668 | 5/1975 | Fed. Rep. of Germany | 187/17 |
| 1574831 | 6/1969 | France. | |
| 271381 | 10/1989 | Japan | 187/112 |
| 664900 | 5/1979 | U.S.S.R. | 187/17 |
| 967985 | 8/1964 | United Kingdom. | |

Primary Examiner—Robert P. Olszewski
Assistant Examiner—Kenneth Noland
Attorney, Agent, or Firm—Kirschstein, Ottinger, Israel & Schiffmiller

[57] ABSTRACT

A mine shaft conveyance system includes a linear motor having spaced, parallel, elongate winding support members carrying stator windings. The winding support members are mountable in a mine shaft so as to extend in the longitudinal direction of the mine shaft. A reaction member is located between the winding support members so as to be driven up and down the mine shaft by electromagnetic forces. The reaction member is flexible about at least one axis transverse to the length of the winding support members. A shaft conveyance which is to be driven up and down the mine shaft is attached to the winding support members.

8 Claims, 2 Drawing Sheets

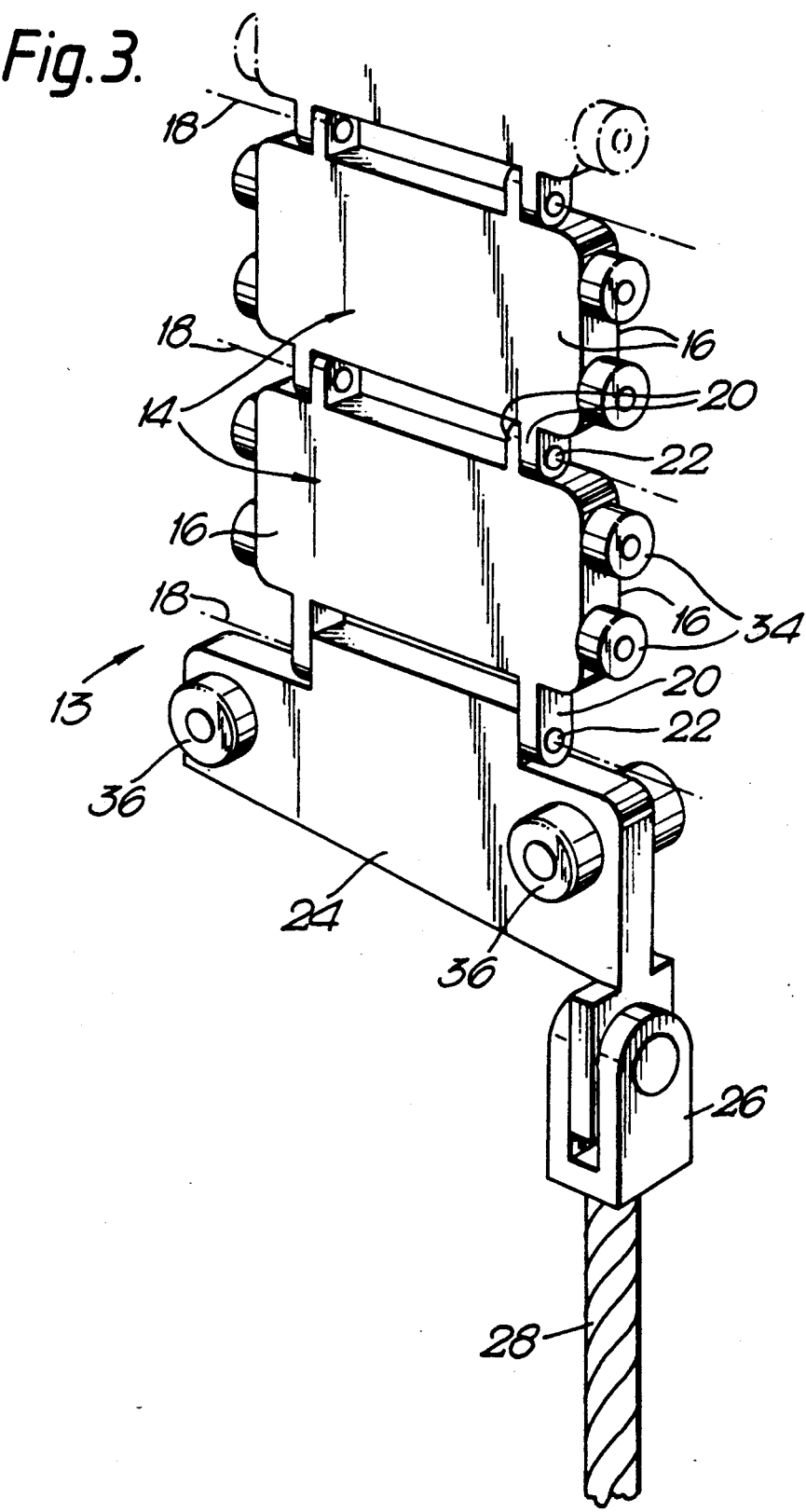

MINE SHAFT CONVEYANCE SYSTEM

BACKGROUND OF THE INVENTION

1. Field of the Invention

This invention relates to a mine shaft conveyance system.

2. Description of Related Art

Existing underground mines use vertical shafts and a system of personnel cages and ore and material skips for transporting men and materials underground. The cages and skips are carried by steel ropes which are wound in and out on drums. In the underground mine itself, trains, conveyors and so forth are used to transport men and materials from one point to another. There are practical limitations on the depth of shafts imposed by the capacities of the winding equipment used to raise and lower the shaft conveyances. In deep mines, this means that sub-shafts may have to be sunk underground. This in turn means that to get to the bottom of the mine, men and materials may have to transfer from one shaft to another. Clearly, the required transfer from one shaft to another is time-consuming and counter-productive. Even when the men and materials have arrived at the required level in the mine, time is lost in travelling by one means or another to the work site.

SUMMARY OF THE INVENTION

It would be advantageous to have an integrated conveyance system in which men and materials could be conveyed from a starting point on the surface to the work site or at least to the lower levels of the mine without having to change shafts.

It is an object of the present invention to provide such a mine shaft conveyance system.

The invention provides a mine shaft conveyance system comprising a linear motor having spaced, parallel, elongate winding support members carrying stator windings, the winding support members being mountable in a mine shaft so as to extend in the longitudinal direction of the mine shaft, and a reaction member located between the winding support members so as to be driven up and down the mine shaft by electromagnetic forces, the reaction member being flexible about at least one axis transverse to the length of the winding support members and having means for the attachment thereto of a shaft conveyance which is to be driven up and down the mine shaft.

In a preferred embodiment, the linear motor is a synchronous motor, in which case the reaction member may comprise one or more permanent magnets. Typically, the reaction member includes a plurality of permanent magnets in articulated relationship. The magnets may, for instance, be articulated to one another for relative pivotal movement about axes which are transverse to the length of the winding support members and which lie in a plane parallel to the faces of the winding support members.

The invention extends to a mine shaft in which:
a) spaced, parallel elongate winding support members carrying stator windings are mounted, the winding support members extending in the longitudinal direction of the mine shaft;
b) a reaction member is located between the winding support members so as to be driven up and down the mine shaft by electromagnetic forces, the reaction member being flexible about at least one axis transverse to the length of the winding support members and having means for the attachment thereto of a shaft conveyance which is to be driven up and down the mine shaft; and
c) guide means extend in the longitudinal direction of the mine shaft for guiding the movement of the conveyance or the reaction member up and down the shaft.

BRIEF DESCRIPTION OF THE DRAWINGS

The invention will now be described in more detail, by way of example only, with reference to the accompanying drawings in which:

FIG. 3 shows a detail of the lower end of the reaction member; and

DETAILED DESCRIPTION OF THE PREFERRED EMBODIMENTS

Figure 1:
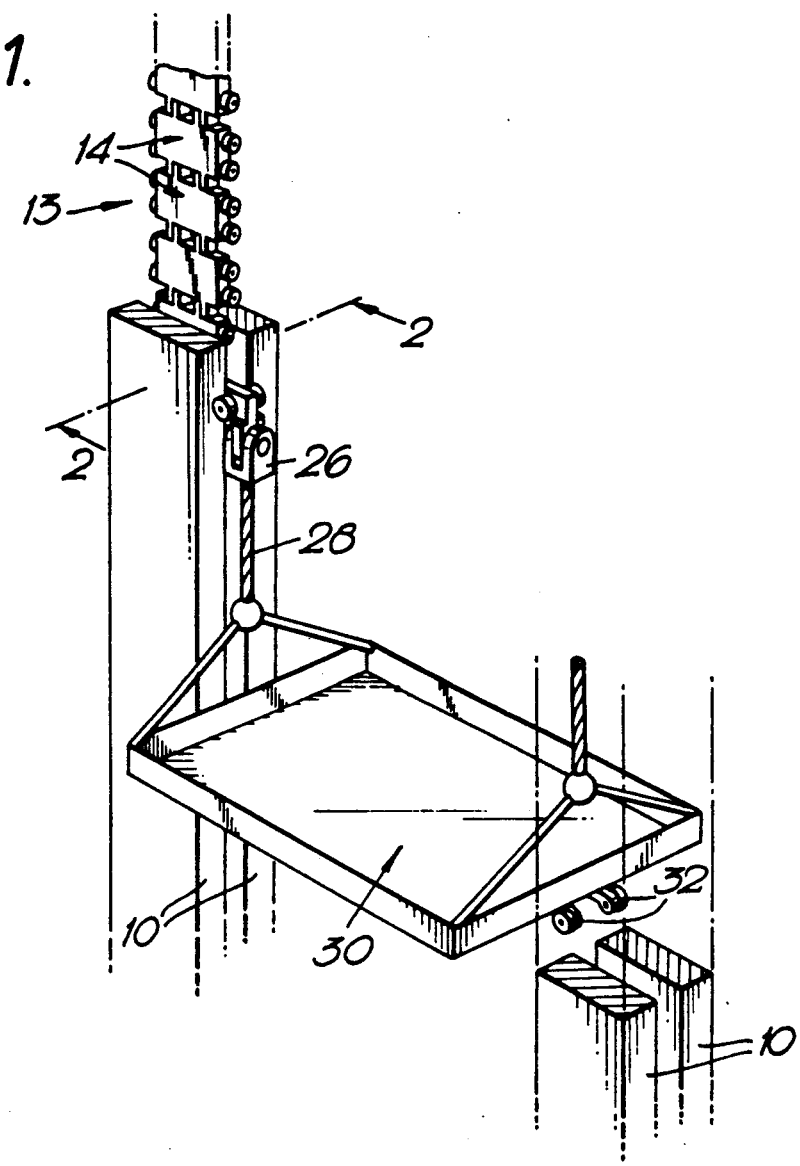
FIG. 1 shows a perspective view of a mine shaft linear motor conveyance system of the invention.
Figure 2:
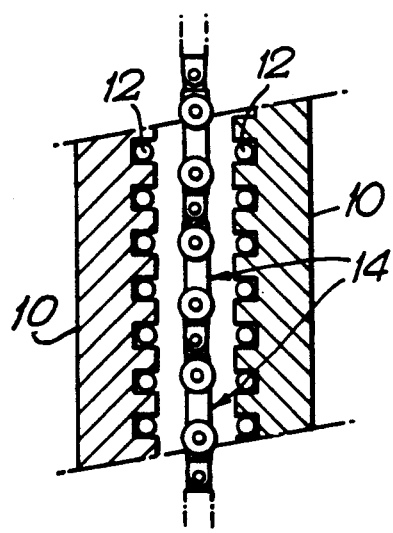
FIG. 2 shows a schematic cross-sectional view at the line 2—2 in FIG. 1.

FIG. 1 shows a mine linear motor conveyance system of the invention. The system includes two pairs of winding support members 10 of a suitable conducting material, such as soft construction and they carry stator windings 12 which are seen in FIG. 2 but which are omitted from the other Figures in the interest of clarity of illustration. The winding support members form the stator of a three-phase synchronous motor.

The reaction members of "rotors" 13 of the motor each comprise a series of permanent magnets 14 of which the poles are at the major surfaces 16. Each permanent magnet 14 may itself be in the form of an assembly of smaller permanent magnet plates laminated together. The magnets 14 are articulated to one another in the manner illustrated in FIG. 3, such that they are capable of pivoting relative to one another about axes 18. The articulation is achieved by means of lugs 20 formed with aligned holes receiving studs 22 in pivotable fashion. The reaction members 13 are located centrally between the winding support members 10 with small airgaps on either side.

A plate 24 is connected in articulated fashion to the lowest magnet 14 of each reaction member 13. Shackles 26 connects cables 28 to the plates, the cables carrying mine conveyance, in the illustrated case represented diagrammatically by a platform 30.

The two pairs of winding support members 10 extend vertically in a mine shaft (not illustrated) and are connected to the shaft buntons or other shaft steelwork. The intention is to drive the platform 30 upwardly and downwardly in the shaft. Those skilled in the art will readily recognise the manner in which the reaction members 13 are driven by electromagnetic forces in the desired direction when current is supplied to the windings 12.

Figure 4:
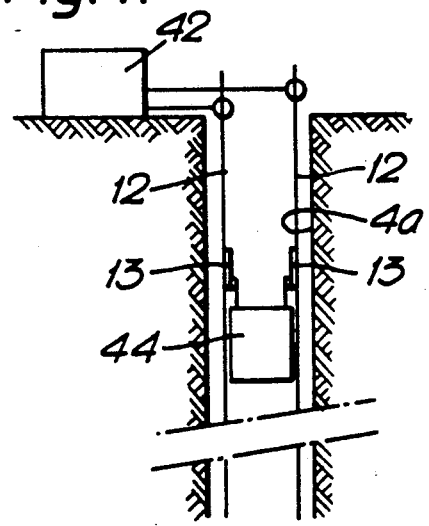
FIG. 4 shows a schematic view of a mine shaft according to this invention.

FIG. 4 shows a schematic view of a mine shaft 40 which may have a considerable depth, possibly a few thousand meters or even more. Electrical current is supplied to the winding support members 12, which are fixed in the mine shaft 40, by means of a surface-located power source 42. The conveyance, typically a cage or skip, which is to be driven up and down the mine shaft is indicated with the reference numeral 44 and the reaction members with the numeral 13.

It will be observed that the axes 18 are at right angles to the direction of designed movement, i.e., they are horizontal, and that they are in a plane parallel to the opposing faces of the winding support members 10. Thus the reaction members 13 are flexible in a vertical plane about the axes 18. The reaction members can flex readily to take account of local variations in the straightness of the winding support members or guiding steelwork, due for instance, to manufacturing or installation inaccuracies, shaft sinking inaccuracies and rock movements in the shaft. This in turn enables the reaction members to maintain their central positions between the winding support member. Furthermore, the flexible nature of the reaction members enables them to turn through the required angle on moving from a vertical path in the shaft to a horizontal path at the surface or underground. Because the magnets 14 are relatively small in size, the reaction members will be able to negotiate curves in the vertical plane of fairly small radius of curvature.

The platform 30 is shown by way of example only. It will be appreciated that the conveyance which is to be driven up and down the shaft could take any one of a variety of different forms, such as personnel cages, ore skips and so forth. Referring to FIG. 1 it will be seen that the platform is fitted with wheels 32 which ride on the edges of the winding support members 10 to guide the platform as it moves. Also, the magnets 24 carry small wheels 34 which will ride on the winding support members in the event of any temporary undesired movement of the reaction members away from their central positions between the winding support members. Further guide wheels 36 are also provided on the plates 24 to ride on rails of guiding steelwork situated alongside the winding support members.

The embodiment described above allows the reaction members to flex in one vertical plane only. However, the invention envisages a modification in which flexure could take place in other planes as well. The magnets 14 could, for instance, be articulated to one another by means of universal hinges. Alternatively, the assembly of magnets could be replaced by one or more magnets which are themselves made of flexible material.

I claim:

1. A mine shaft conveyance system, comprising: a linear motor having spaced, parallel, elongate winding support members carrying stator windings, the winding support members being mountable in a mine shaft having a longitudinal direction, and having lengths extending along said longitudinal direction; and a reaction member located between the winding support members so as to be driven up and down the mine shaft by electromagnetic forces, the reaction member comprising a plurality of magnetic members articulated together about axes transverse to the lengths of the winding support members, and having means for the attachment thereto of a shaft conveyance which is to be driven up and down the mine shaft with the reaction member.

2. A mine shaft conveyance system according to claim 1, wherein the linear motor is a synchronous linear motor and the magnetic members are permanent magnets.

3. A mine shaft conveyance system according to claim 2, wherein the magnets are articulated to one another for relative pivotal movement about said axes which are transverse to the lengths of the winding support members and which lie in a plane parallel to faces of the winding support members.

4. A mine shaft conveyance system according to claim 1, and comprising a member articulated to the reaction member and having means thereon from which the shaft conveyance can be suspended.

5. A mine shaft in which:
  (a) spaced, parallel, elongate winding support members carrying stator windings are mounted, the winding support members having lengths extending along a longitudinal direction of the mine shaft;
  (b) a reaction member is located between the winding support members so as to be driven up and down the mine shaft by electromagnetic forces, the reaction member comprising a plurality of magnetic members articulated together about axes transverse to the lengths of the winding support members, and having means for the attachment thereto of a shaft conveyance which is to be driven up and down the mine shaft with said reaction member; and
  (c) guide means extend in the longitudinal direction of the mine shaft for guiding the movement of at least one of the conveyance and the reaction member up and down the shaft.

6. A mine shaft according to claim 5, wherein the winding support members and the reaction member constitute a synchronous linear motor, the the magnetic member being permanent magnets.

7. A mine shaft according to claim 6, wherein the magnets are articulated to one another for relative pivotal movement about said axes which are transverse to the lengths of the winding support members and which lie in a plane parallel to faces of the winding support members.

8. A mine shaft conveyance system, comprising: a linear motor having spaced, parallel, elongate winding support members carrying stator windings, the winding support members being mountable in a mine shaft having a longitudinal direction, and extending along said longitudinal direction; and a reaction member located between the winding support members so as to be driven up and down the mine shaft by electromagnetic forces, the reaction member comprising at least one permanent magnet to permit operation of said linear motor as a synchronous linear motor, and having means for the attachment thereto of a shaft conveyance which is to be driven up and down the mine shaft with said reaction member.

* * * * *